Figure 1:
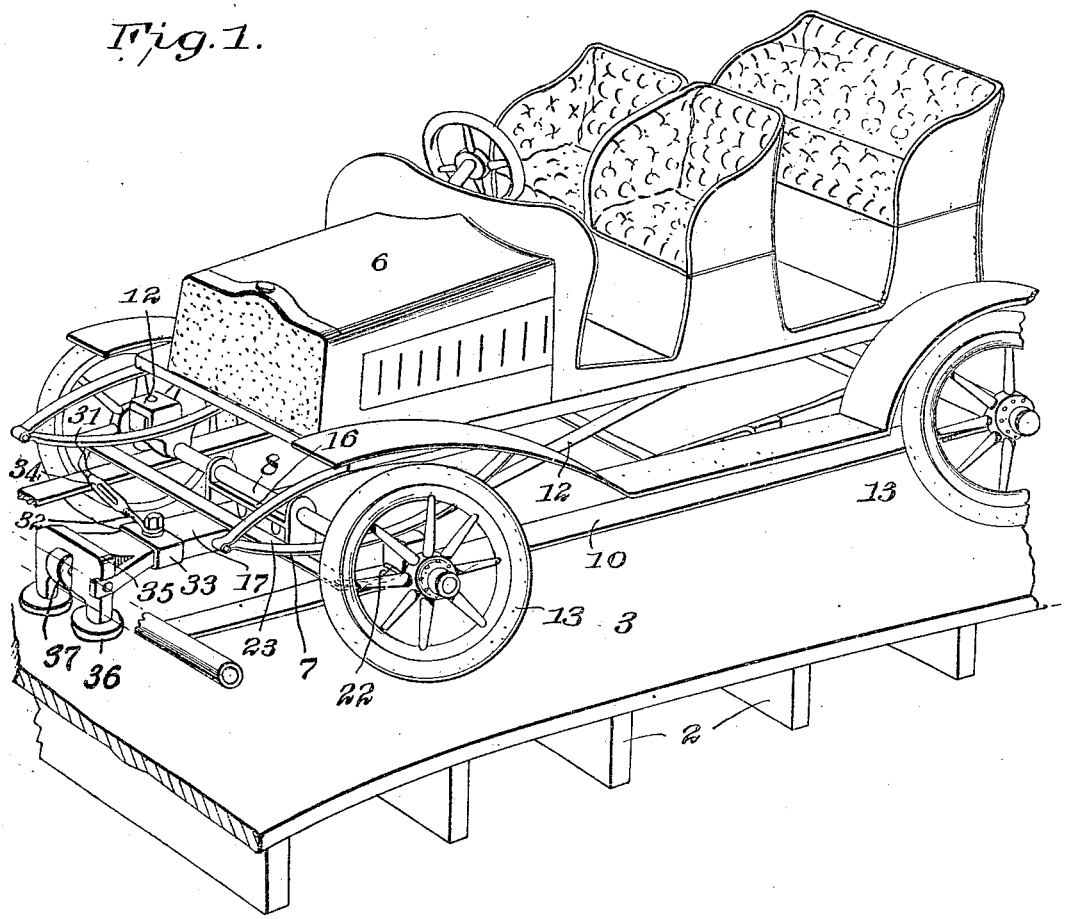

A. G. NEVILLE.
GRAVITY AUTOMOBILE.
APPLICATION FILED JULY 31, 1909.

958,160.

Patented May 17, 1910.
2 SHEETS—SHEET 1.

Witnesses
O. N. Woodson
Juana M. Fallin

Inventor
Asa G. Neville,
By
[signature]
Attorneys

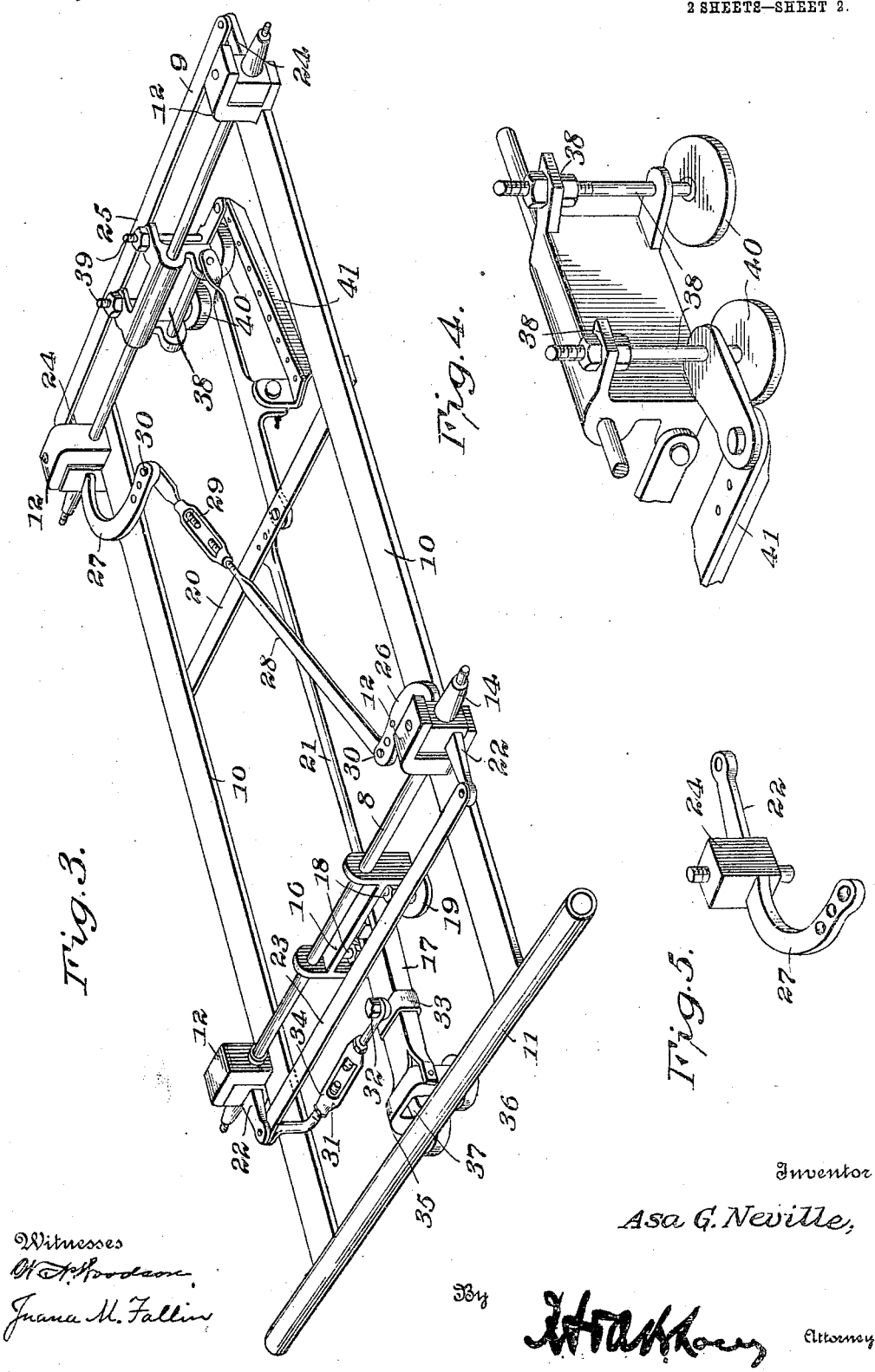

UNITED STATES PATENT OFFICE.

ASA G. NEVILLE, OF WELLSBURG, WEST VIRGINIA.

GRAVITY-AUTOMOBILE.

958,160.     Specification of Letters Patent.     Patented May 17, 1910.

Application filed July 31, 1909. Serial No. 510,551.

*To all whom it may concern:*

Be it known that I, ASA G. NEVILLE, citizen of the United States, residing at Wellsburg, in the county of Brooke and State of West Virginia, have invented certain new and useful Improvements in Gravity-Automobiles, of which the following is a specification.

This invention relates to automobile scenic railways and particularly to a gravity actuated automobile, the steering control of which is secured by means of a track of any suitable description attached to a roadway upon which the car moves, the steering being entirely taken out of the hands of those occupying the car.

The invention is an improvement on the car and track shown in my former application for patent on this class of railways and automobiles, Serial No. 467,467, filed December 15, 1908 and my application Serial No. 481,909, filed March 8, 1909.

The objects of this present invetnion are first; to produce an automobile wherein all the traction wheels are simultaneously veered as one, the forward wheels being veered in opposite directions to the rear wheels, thus permitting the car to make very short turns; second to provide an automobile peculiarly adapted to scenic railroads wherein the car is provided with a front steering trolley adapted to engage with a track upon the roadway over which the car runs, this steering trolley being connected to the front wheels to veer the same and the front wheels being connected to the rear wheels, so that all four traction wheels will veer simultaneously, as above referred to.

A further object is to provide means for adjusting the amount of movement of the traction wheels relative to the movement of the guiding trolley, so that the traction wheels may be veered to a greater or less degree relative to the guiding movement of the trolley, thus enabling the traction wheels to make shorter or larger turns as desired.

A still further object is to provide means for adjusting the four traction wheels relatively to each other and to the guiding trolley, so that the wheels of each pair may be held in proper parallelism with each other, and that when the guiding trolley is directed forward in a line coincident with the axis of the car, that the traction wheels shall be parallel with said longitudinal axis, in other words, that the front traction wheels shall be parallel at all times to the trolley arm.

Figure 2:
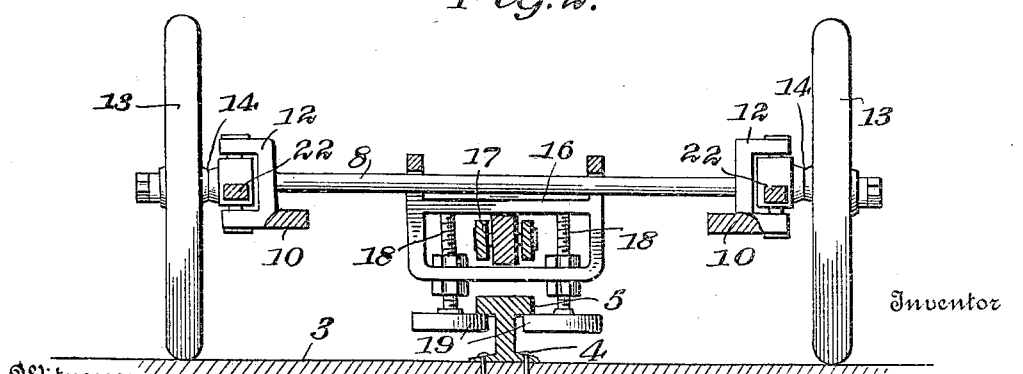

For a full understanding of the invention and the merits thereof and also to acquire a knowledge of the details of construction, reference is to be had to the following description and accompanying drawings, in which:

Figure 1 is a perspective view of an automobile constructed in accordance with my invention; Fig. 2 is a transverse sectional view thereof, the body being omitted; Fig. 3 is a perspective view of the running gear; Fig. 4 is a similar view of a portion of the guiding or controlling devices; and, Fig. 5 is a perspective view of a bell crank arm hereinafter specifically referred to.

Corresponding and like parts are referred to in the following description and indicated in all the views of the drawings by the same reference characters.

Referring to the figures, 2 designates a substructure of any desired or suitable character, such as is used for scenic railways, it being understood however that I do not wish to limit myself to any particular sub-structure, or to the use of a sub-structure at all. This sub-structure supports a roadway 3 of any desired character, preferably a plank roadway and the center of the roadway is provided with a rail 4 having the flanged head 5 usual to the ordinary rail. This rail acts as the steering means for the car.

The car is designated 6 and is intended to be of any suitable construction, but is shown as having the general form of an automobile. This car is preferably propelled by gravity, though I do not wish to limit myself to this, as the car might be propelled by its own power. The car is unprovided with any steering mechanism under the control of the occupants, the car engaging with the rail 4 and being steered thereby, as will be hereafter described.

The car is supported on bowed springs 7 which at their middles are attached to transverse bars 8 and 9. The ends of these bars are supported upon longitudinal bars 10 which preferably extend from the rearmost bar 9 to a point in front of the car where they are joined by a transverse fender 11. The ends of the bars 8 and 9 are each provided with bifurcated knuckle heads 12. The traction wheels 13 are each carried upon a stub axle 14, the end of this axle being formed with a knuckle 15 which extends into the space between the bifurcated ends of the heads 12. It will, of course, be understood that the wheels 13 are freely movable upon the axles 14, in other words, these wheels are mounted as are the ordinary steering wheels of an automobile.

Mounted upon the bar 8 is a yoke 16 which carries pivotally mounted upon it the rear end of a trolley arm 17. Of course, the pivotal engagement of the trolley arm permits it to reciprocate laterally. Passing through the yoke on either side of the pivotal point of the trolley arm, are the vertical adjusting screws 18, each carrying on its lower end the freely rotatable guide rollers 19. These are adapted to contact on either side of the rail 4 and beneath the head of the same, in the manner described in my former application No. 481,909.

The longitudinal bars 10 are connected intermediate of their ends by a transverse brace 20, and a rod 21 connects the yoke 16 with said brace. The stub axles 14 of the forward pair of traction wheels are each provided with a forwardly extending bell crank arm 22, usual in steering wheels of this character, these bell cranks being connected by the connecting rod 23. It will be seen that both the forward wheels will thus move together. The rear traction wheels also have their stub axles each provided with a rearwardly projecting bell crank arm 24, the arms of the two bell cranks being connected by the connecting rod 25, whereby the rear traction wheels will move together. One of the stub axles has attached to it and projecting rearwardly and inwardly from it, the arm 26, while the diagonally opposed rear traction wheel has upon its axle the forwardly and inwardly projecting arm 27. These arms are provided with a plurality of perforations. The two arms are connected by a diagonally extending connecting rod 28 which is formed in two sections, each section being reduced at its inner end and formed with screw threads to engage with a turn buckle 29, whereby the connecting rod as a whole may be shortened or lengthened. The connecting rod is attached to the arms 26 and 27, which project from the steering knuckles, by bolts 30, which may be adjusted at any point desired by the perforations in said arms. It will be obvious that by turning the turn buckle in one direction or the other that the connecting rod will be contracted or expanded, and that thus these sets of forward and rear wheels may be brought into alinement with each other, so that when the forward wheels are veered, the rear wheels will be likewise operated or veered, and to the same degree as the forward wheels. It will also be seen that as the knuckle of the forward steering wheel is connected to the knuckle of the diagonally opposite rear wheel, the two sets of wheels will be actuated in opposite directions, so that when one veers to the right, the other will veer to the left, and vice versa. This provision of forward and rear steering wheels veering simultaneously in opposite directions, is of course old in the art.

In order to move the front traction or steering wheels by means of the trolley arm 17, I provide a connecting rod 31 which at one end is pivoted to the extremity of one of the bell crank arms 22 at its junction with the connecting rod 25. The other end of the connection 31 is pivoted upon a stud 32 extending upward from a collar 33 which is shiftable upon the trolley arm 17 and may be adjusted in its shifted position by means of a set screw, this set screw being conveniently the stud 32. The connection 31 is made in two sections connected by a turn buckle 34. By this means the collar may be shifted longitudinally along the trolley arm to any desired position and there clamped thereon, thereby increasing or decreasing the leverage of the trolley arm in its relation to the forward wheels, and thereby increasing or decreasing the scope of movement of the forward wheels (and per consequence the rear wheels) in relation to the scope of movement of the trolley arm. The turn buckle 34 is for the purpose of lengthening or shortening the connection 31, so as to bring the front steering wheels into absolute parallelism with the trolley arm.

It will be obvious that in an automobile gravity road of the character described it is absolutely necessary that the front steering wheels shall move parallel to the steering arm, and also absolutely necessary that the rear steering wheels shall have the same extent of movement as the front steering wheels, though in an opposite direction, hence the importance of a provision for adjusting the length of the connecting rods 31 and 28.

As shown in my former application, filed on March 8, 1909 and before referred to, the front end of the trolley arm is provided with a head 35 having downwardly projecting studs carrying opposed rollers 36, the head also being provided between the studs with the vertical roller 37. The opposed rollers 36 are adapted to contact with the web of the rail beneath the head thereof, while the roller 37 runs along the tread of the rail.

The rear end of the car is held to the track by substantially the same construction as that shown for the forward end of the car, in other words, the transverse bar 9 is provided with a yoke having the general form of a plate 38, this plate having opposed upper and lower rearwardly extending lugs. Through these lugs pass adjusting screws 39 provided with set nuts, the lower ends of these screws carrying the freely movable opposed rollers 40 adapted to contact on either side of the web of the central rail and beneath the head thereof. This yoke is slidably mounted upon the bar 9, so that the car can move laterally in rounding curves, though the rollers carried by the yoke are in engagement with the guiding rail. This construction, whereby the rear yoke has a sliding movement with the bar 9, which is practically a rear bolster, may be of any character described, or of the form shown in my prior application No. 481,909 of March 8, 1909, previously referred to.

Preferably the car is provided on its under side with a fixed brake shoe 41 which is mounted in any suitable manner, extends longitudinally of the car, and is adapted to contact with a rounded projection or hump located at proper positions along the line of the roadway, as near a stopping place or when it is desired to check the momentum of the car on dangerous curves.

The particular advantages of my invention lie in the means for alining the front and rear wheels and holding them in proper relative positions to each other, and the means for adjusting the front steering wheels with relation to the trolley arm, so that the front steering wheels shall always be parallel to the arm.

A still further improvement is in the provision of the means for adjusting the throw of the trolley arm to the throw of the front wheels, so as to change the relative scope of the veering movement of the steering wheels to the scope of movement of the trolley arm.

Having thus described the invention what is claimed as new is:

1. A car of the kind described having a guiding trolley supported thereon and adapted to engage with a guiding track, knuckle-supported front and rear traction wheels on the car, connections between the front wheels whereby they shall have parallel movement, connections between the rear wheels whereby they shall have parallel movement, means connecting the front and rear wheels so that they shall move in opposite directions to each other, and a connection between the said trolley and the wheels for moving the latter from the former.

2. A car of the kind described having a guiding trolley pivotally mounted on the car and projecting in front of the same, said trolley adapted to engage with a guiding track, knuckle-supported front and rear traction wheels on the car, connections between the front wheels whereby they shall have parallel movement, connections between the rear wheels whereby they shall have parallel movement, means connecting the front and rear wheels so they shall simultaneously move in opposite directions, and a connection between the trolley and said front wheels for moving the front wheels upon a movement of the trolley and in the same direction.

3. A car of the kind described having a forwardly projecting guiding trolley supported thereon, adjustable knuckle-supported pairs of front and rear wheels, connections between the front wheels whereby they shall have parallel steering movement, connections between the rear wheels so that they shall have parallel steering movement, means connecting the front and rear wheels so that they shall have simultaneous steering movement in opposite directions to each other, and an adjustable connection between the trolley and the front wheels, said connection being adapted to be lengthened or shortened.

4. A car of the kind described having a guiding trolley supported beneath the car and projecting forwardly therefrom and adapted to engage with a guiding track, opposed front steering wheels, each pivotally supported on the car for a lateral steering movement, connections between the front wheels whereby they shall move together, and an adjustable connection between said trolley and the front wheels, said connection being adapted to be lengthened or shortened.

5. A car of the kind described having a guiding trolley pivotally supported upon its forward end and projecting forwardly from the car, the forward end of the trolley being adapted to engage with a guiding track, an opposed pair of forward wheels, an opposed pair of rear wheels, each of said wheels being so mounted as to turn laterally and being formed with bell crank arms, connecting rods between the arms of the bell cranks of each pair of wheels, whereby the wheels of each pair will move together in one direction, a connection between the said trolley and the forward pair of wheels, whereby said wheels shall move with the trolley, and a connecting rod from the front wheels to the rear wheels so arranged that the rear wheels shall turn simultaneously in an opposite direction to the front wheels, said connecting rod being formed in two sections, the sections being connected to each other by a turn buckle, whereby the rod as a whole may be lengthened or shortened.

6. A car of the kind described having a guiding trolley pivotally supported on its forward end for lateral movement, the forward end of the trolley being adapted to engage with a guiding track, knuckle heads mounted on the car body, forward and rear opposed stub shafts mounted in the knuckle heads, forward and rear opposed traction wheels rotatable on the stub shafts, arms on each pair of stub shafts projecting in the same direction, a connecting rod between the arms of each pair, an arm connected to one of the stub shafts of the forward wheels and projecting therefrom, an arm on one of the stub shafts on the diagonally opposed stub shaft on the rear of the machine and projecting inwardly, and a connecting rod between the two arms, said connecting rod being adjustable as to length.

7. A car of the kind described having a guiding trolley pivotally supported on its forward end for lateral movement, said trolley being adapted to engage with a guiding track, forward steering wheels mounted upon the forward end of the car for parallel lateral movement, a connection between one of the steering wheels and the opposed wheel whereby they shall move simultaneously, a member mounted on the trolley and longitudinally adjustable therealong, and a connection between the said member and said front steering wheels.

8. A car of the kind described having a guiding trolley pivotally supported on its forward end for lateral movement, said trolley being adapted to engage with a guiding track, forward steering wheels mounted upon the forward end of the car for parallel lateral movement, a connection between one of the steering wheels and the opposed wheel whereby they shall move simultaneously, a member mounted on the trolley and longitudinally adjustable therealong, and a connection between the said member and said front steering wheels, said connection being adapted to be shortened or lengthened.

9. A car of the kind described having a guiding trolley pivotally supported on its forward end for lateral movement, said trolley being adapted to engage with a guiding track, forward steering wheels mounted upon the forward end of the car for parallel lateral movement, a connection between one of the steering wheels and the opposed wheel whereby they shall move simultaneously, a member mounted on the trolley and longitudinally adjustable therealong, and a connecting rod between the said member and said front steering wheels, said connecting rod being formed in two sections connected by a turn buckle.

10. A car of the kind described having a guiding trolley pivotally mounted on its forward end and projecting ahead of the car, the forward end of the trolley being provided with means engaging with a guiding track, opposed steering wheels mounted on the forward end of the car for lateral turning movement, arms projecting from said wheels, a connecting rod between said arms, a sliding collar on the trolley and adjustable longitudinally therealong, means for holding the collar in its adjusted position, and a connecting rod between said collar and one of said steering wheels, said connecting rod having means whereby it may be adjustably lengthened or shortened.

11. A car of the kind described having a supporting frame, steering yokes on said frame extending down below the same, each of said yokes being provided with means for engaging a guiding rail located on the roadway over which the car is intended to travel, the yokes being adapted to slide transversely with relation to the said frame, a trolley pivotally supported upon this said frame and extending forward of the car, the forward end of the trolley being adapted to engage with said guiding rail, forward steering wheels each mounted for a lateral steering movement, bell crank arms on the bearings of said wheels, connecting rods between the arms of each pair of wheels, a diagonal connecting rod between the bearings of one pair of wheels and the bearings of the other pair, so arranged that the rear pair of wheels will simultaneously turn in an opposite direction to the forward pair when the forward pair are actuated, and a connection between said guiding trolley and the bearings of the forward pair of steering wheels.

12. In a car of the character described, a guiding trolley arm pivotally supported upon the forward end of the car, the forward end of said trolley arm being provided with means for engaging a guiding track, knuckle-supported front and rear wheels on the car, connection between the front wheels whereby they shall turn together and in the same direction, connections between the rear wheels whereby they shall turn together and in the same direction, connections between the front and rear pair of wheels whereby the latter pair of wheels turn simultaneously with the front pair but in an opposite direction, a connection between the front wheels and the trolley arm whereby the front wheels shall turn laterally in the same direction as and with the movement of the trolley arm, opposed rolls depending from the car body at the forward end thereof and adapted to engage said guide rail, a yoke slidingly supported upon the rear of the car body, and opposed track engaging rails mounted upon said yoke and adapted to engage on either side of said rail.

13. A car of the character described having a guiding trolley adapted to engage with a guiding track, a front pair of traction wheels connected to veer with the guiding trolley, a rear pair of traction wheels, a connection between the front and rear pair of wheels, and means for adjusting the rear pair of wheels independently of the front pair of wheels into parallelism therewith.

14. A car of the character described, having a guiding trolley adapted to engage with a track, a pair of front steering wheels connected to veer with said guiding trolley, a pair of rear steering wheels, each wheel of the pair being pivoted for lateral steering movement, a connection between the front wheels and the rear wheels, whereby the rear wheels may be oppositely moved simultaneously with a steering movement of the front wheels, and means for moving the rear pair of wheels independently of the front pair of wheels into parallelism with the front wheels.

15. A car of the kind described, having a guiding trolley supported beneath the car and projecting forwardly therefrom and adapted to engage with a guiding track, knuckle-supported front and rear pairs of wheels, bell cranks connected to said wheels, connecting bars connecting the bell cranks of each pair of wheels to said trolley, whereby the front pair of wheels shall move with said trolley, and a connecting rod extending from the bell crank of one of the forward wheels to the bell crank of the diagonally opposed wheel of the rear pair of wheels, said connecting rod having means whereby it may be lengthened or shortened and whereby the rear pair of wheels may be independently adjusted into parallelism with the front wheels.

16. A car of the kind described, having a guiding trolley supported beneath the car and projecting forwardly therefrom and adapted to engage with a guiding track, knuckle-supported front and rear pairs of wheels, bell cranks connected to said wheels, connecting bars connecting the bell cranks of each pair of wheels to said trolley, whereby the front pair of wheels shall move with said trolley, a connecting rod extending from the bell crank of one of the forward wheels to the bell crank of the diagonally opposed wheel of the rear pair of wheels, said connecting rod being made in two sections, and a turn buckle connecting the two sections, whereby the rod as a whole may be lengthened or shortened and the rear pair of wheels thereby brought into parallelism with the front pair of wheels.

In testimony whereof I affix my signature in presence of two witnesses.

ASA G. NEVILLE. [L. S.]

Witnesses:
C. B. MAGEE,
D. W. BAIRD.